3,070,506
PROCESS OF PREPARING HEMATINIC FOR
PARENTERAL ADMINISTRATION
Wayne H. Linkenheimer, New City, and Ernest L. Patterson, Pearl River, N.Y., and John A. Brockman, Jr., Westwood, N.J., assignors to American Cyanamid Company, New York, N.Y., a corporation of Maine
No Drawing. Filed Apr. 4, 1960, Ser. No. 19,450
4 Claims. (Cl. 167—68)

This invention relates to an improved injectable ferric hydroxide complex and to a process of preparing the same.

A considerable problem is presented when it is desired to prepare ferric hydroxide complexes with a high iron content suitable for intramuscular injection. Dilute dispersions, usually referred to as iron sols, are easily prepared and stabilized but when higher concentrations are involved, for example, containing more than 1% or 2% of iron, the problem becomes serious. Probably the most important single use is in combatting iron deficiency anemia in new born piglets. Under modern pig farming conditions, most of the piglets develop symptoms of anemia. Serious mortality and slower growth result. It is not possible to inject sufficient dilute iron sol into a piglet to give sufficient iron to combat the anemia because of the excessive volume that would be required. The small animal will tolerate only a certain volume of injected dispersion and with dilute dispersions, this volume gives insufficient iron.

Another field of importance is in the treatment of other domestic animals such as lambs, kids, calves, and the like. The concentrated iron sols are, of course, equally useful in the treatment of adult animals but the occurrence of iron deficiency anemias in older animals is less frequent.

There are two kinds of iron sols or ferric hydroxide dispersions, those having a negative charge and those having a positive charge. The former are usually prepared by precipitating ferric hydroxide from a solution of a ferric salt, such as ferric chloride, followed by peptizing by warming with additional alkali. While it is possible to prepare a sol with a positive charge by the common method of partial neutralization of a solution of a ferric salt, the positively charged sol can also be produced by a simple process involving the use of anion exchange resins. Moderately weak base anion exchange resins are best, although stronger base anion exchange resins may be used. The resin method presents great advantages in producing a concentrated stabilized sol. A whole step in the process is eliminated because it is not necessary to remove electrolytes, such as sodium chloride, which are produced by the neutralization and which present quite a problem as they have to be removed by dialysis or other cumbersome procedures. The positive sols stabilized in accordance with the present invention also have further advantages apart from their method of manufacture which will be brought out below.

A successful solution of the stabilization of iron sols having somewhat higher iron concentration was effected in England by stabilizing the negatively charged iron sol with special low viscosity partially depolymerized dextran. Dextran is a high molecular weight carbohydrate produced by microorganism fermenting sugar and is an anhydroglucose polymer with the linkages predominantly through the 1-6 positions on the anhydro-glucose unit. As the 6-position is the only primary alcoholic group, 1-6 linkage results in a polymer having only secondary alcoholic hydroxyls, three per anhydro-glucose unit. Dextran, therefore, which is predominantly 1-6 linked and contains only a small amount, normally less than 10%, of 1-4 or other linkages, has substantially only secondary alcoholic hydroxyls with very few primary alcoholic hydroxyls in the molecule. As normally produced by the microorganisms, the dextrans have high molecular weights, in the millions, and for some purposes they have been used in this form. It has been customary to depolymerize dextrans down to an average molecular weight of about 75,000 for use as plasma extenders. These partially depolymerized dextrans are usually referred to as clinical dextrans.

The stabilization of the negative iron sol which was effected used a still further depolymerized dextran with molecular weights more of the order of six to twenty thousand. For convenience, intrinsic viscosities, which for a given type of compound are a function of molecular weight, are used in describing the dextrans. The stabilized sol is described in the London and Twigg patent, 2,820,740, January 21, 1958, and uses dextrans with an intrinsic viscosity of from 0.025 to 0.25. The London and Twigg procedure did in fact produce a stable negative ferric hydroxide sol in which the complex with the dextran was non-ionic.

Throughout the present specification and claims, the sols will be referred to as ferric hydroxide sols. This is customary in the art and is not intended to limit the invention to an exact chemical formula, as in the complexes formed it is possible that the iron is in a hydrated ferric oxide form which is not identical with the structure implied by the formula of ferric hydroxide. Nevertheless, it has about the same proportion of elements and is customarily used as the designation in the art for this type of sol.

The London and Twigg product is practically useful. However, it has serious drawbacks. The first is that it is extremely difficult to get both good yields and optimal viscosity for injection. When dextrans with an intrinsic viscosity of about 0.2 are used, yields are quite poor. On the other hand, when dextrans of a lower intrinsic viscosity, of the order of magnitude of 0.05, are used, the viscosity of the iron sol is not satisfactory for injection because when the required large quantity is injected into a new born pig and the needle is withdrawn a portion of the injected material flows out. The pig does not get the full dose and the amount that flows out will vary with the technique used by the man making the injection, the particular piglet and other factors so that it is difficult to introduce just the right amount of iron each time. The second drawback is that the process of making the final injectable product requires the additional step of freeing from electrolytes by dialysis or other cumbersome means. This involves an additional step which adds considerably to the cost. In spite of the above drawbacks, dextran stabilized, moderately high concentration ferric hydroxide sols are pratically used and do represent some advance over what was available before. A third drawback is that the product of the London and Twigg patent include iron concentrations only up to about 5% iron content.

The present invention produces an extremely high concentration of stabilized ferric hydroxide sol containing up to about 100 milligrams per milliliter of iron. It is also possible to produce somewhat less concentrated iron sols, for example, 50 to 55 milligrams per milliliter of iron. For some purposes, the maximum iron concentration is not necessary although, particularly for the treatment of new born piglets, the maximum concentration produces better results and is therefore preferred.

Another advantage of the product of the present invention is that the viscosity of the sol can be adjusted for different injection techniques so that there is no flowback of injected sol when the needle is removed. The stability is perfect throughout the range of desired viscosity and the product can be produced reliably without encountering spoiled batches. This extreme reliability is of great practical importance as the cost of spoiled batches is not only high but where stability is marginal, even batches which initially appear satisfactory may deteriorate when stored or used under adverse conditions. Even at a maximum concentration of about 100 milligrams per milliliter of iron, the product is uniform and reliable, and for the first time, makes available uniformly stable sols of controlled viscosity containing iron percentages up to 10%. In general, the present invention is advantageous for the production of ferric hydroxide sols containing in excess of 1% of iron.

While the present invention is primarily directed to a new and improved product, there is also included an improved process which permits markedly cheaper production with maximum reliability and iron content. In another aspect of the invention, therefore, the new process is also included.

According to the present invention, positively charged ferric hydroxide sols are preferably prepared by a reaction of solutions of ferric salts, such as ferric chloride, with an anion exchange resin. These sols are stabilized with a particular kind of dextrin derived from potato starch and normally referred to as "canary yellow dextrin" or sometimes as "yellow dextrin." It is essential that the canary yellow potato dextrin be of low viscosity. The intrinsic viscosities may vary over approximately the range of about 0.06 to about 0.16. Good stabilization is available throughout the range and can be matched with the viscosity desired for maximal injective efficiency.

Another important characteristic of the stabilized sol is that a large amount of water can be removed by distillation without causing gelling and it is thus possible to produce sols with 10% of iron or higher. The dextrin must be low viscosity canary yellow potato dextrin and not dextrin from some other starch. The ferric hydroxide sol should preferably have a positive charge although this is not essential.

Dextrins are prepared by hydrolysis and depolymerization of starches which are anhydro-glucose polymers. Their linkage is predominantly 1-4 with only a minor amount of 1-6 linkage. In other words, contrary to the dextrans, about a third of the hydroxyl groups in the molecule are primary alcoholic groups. Dextrans and dextrins are not in any sense equivalents, for the particular dextrins of the present invention will stabilize concentrated sols with a positive charge whereas dextrans will not and can only stabilize such sols having a negative charge. In the case of the present invention, it is not even sufficient to use dextrins, as most dextrins are not effective. For example, dextrins derived from corn starch, tapioca starch and the like are not useful and will not stabilize high concentration ferric hydroxide sols. Potato starch, when depolymerized to form canary yellow dextrins of low viscosity, appear to have some kind of chemical constitution which is different from the other dextrins. At any rate, they are the only dextrins which are operative in the present process. Dextrins from other starches are capable of stabilizing negatively charged ferric hydroxide sols, but they will not stabilize those having a positive charge any more than the dextrans will.

It is not known what the particular difference in chemical constitution is that makes the canary yellow potato dextrins of low viscosity useable in the present invention whereas dextrins derived from other starches, even though of the same intrinsic viscosity, will not work. There is not the well marked chemical difference between the dextrins that there is between a dextrin and a dextran and just what causes one particular type of dextrin to be operative in the present invention when all others are not is not known and it is not intended to restrict the present invention to any theory of why this is so. It is a fact that a large number of dextrins have been tried, no dextrins derived from starches other than potato starch work, and all canary yellow dextrins of the proper intrinsic viscosity derived from potato starch are operative.

It should be pointed out that a dextrin must fulfill all of the following five requirements in order to be useful at all.

(1) It must have a range of intrinsic viscosities so that at the desired ratio of iron to dextrin, in the desired concentration of iron, formulation will result which is sufficiently fluid to be injectable but not so fluid as to permit considerable leakbacks.

(2) It must stabilize the iron sol in solution when the pH is adjusted from about 2 to 3 to about 6.5 to 8.

(3) It must stabilize the concentrated iron sol in solution when the solution is concentrated from dilute solution to 100–105 milligrams of iron per milliliter.

(4) It must stabilize the iron sol in solution when sodium chloride is added to a maximum of .3 on concentration.

(5) It must stabilize the iron sol in solution when the formulation is sterilized by autoclaving.

In addition to the new stabilized concentrated ferric hydroxide sols containing 1% to 10% of iron, in a more specific aspect, the improved process of making the stabilized iron sols by means of anion exchange resins is included in the invention. It should be understood that any anion exchange resin may be used, but that for best operation it is preferred not to use a very strong base anion exchange resin but to use a weaker base one which is easier to regenerate. Any of the standard anion resins in the hydroxyl form may be used, excellent results being obtained with the weak base resins of the polystyrene polyamine type. The invention is not in any way concerned with the particular anion exchange resin.

The process of the invention is also not limited to the use of ferric chloride as the raw material. Other simple, soluble ferric salts may be used.

For best stabilization, it is desirable to add the dextrin in powdered form to the iron sol followed by warming. Mixing the sol with a solution of dextrin does not produce optimal results reliably. While the particular mixture of dextrin and sol is of importance, the temperature is not critical; the warming may be at 45–115° C. or slightly higher. Best results are obtained with temperatures of 65–100° C. After warming, the sol can be further concentrated by removal of water up to at least 10% iron content.

The invention will be described in greater detail in conjunction with the following specific examples in which the parts are by weight unless otherwise specified.

EXAMPLE 1

One hundred parts of ferric chloride hexahydrate were dissolved in 1000 parts of distilled water. A weak base anion exchange resin of the polystyrene polyamine type (hydroxyl form) sold by the Rohm and Haas Company under the designation Amberlite IR–45 (Patent No. 2,591,574), was then added in portions at a rate to maintain a constantly rising pH. When the pH rose to 3.1, the resin was filtered off from the solution which contained 0.46 milligram per milliliter of total chloride and 11 milligrams per milliliter of iron. To 750 parts of the filtrate, there was added 65 parts of a canary yellow dextrin derived from potato starch having an intrinsic viscosity of 0.088 and sold by the Stein Hall Company under the designation CD, Canary Potato Dextrin. The dextrin was 99% soluble and is typical of a low viscosity, high solubility canary yellow potato starch dextrin. The solution was heated to 65° C. and then concentrated to an iron content of 52 milligrams per milliliter. 0.81 part of phenol was added as a preservative. The pH was adjusted to 7 with the addition of 2 N aqueous NaOH and water added to bring back the volume to 162 parts. A stable ferric hydroxide sol resulted which on injection into new born pigs did not leak back on withdrawal of the syringe.

EXAMPLE 2

The procedure of Example 1 was repeated using a canary potato dextrin having an intrinsic viscosity from .125 to .155 sold by the Morningstar Paisley Company as No. 621 Canary Potato Dextrin. It is completely soluble in water with a pH of a 25% solution between 2.8 and 3.0 and a viscosity between 93 and 98 millipoises. A thoroughly stabilized injectable dispersion resulted having the same desirable characteristics of not leaking back after withdrawal from a syringe on injection into new born piglets.

EXAMPLE 3

Twenty parts of ferric chloride hexahydrate was dissolved in 200 parts of water. Sixty-four parts of 2.5 N NaOH solution was added with good stirring until the pH rose to 2.5. A ferric hydroxide sol resulted and 32 parts of dextrin of Example 1 was added and the mixture heated on a steam bath until a solution resulted. The solution was then dialized with several changes of distilled water and concentrated to 75 milligrams per milliliter of iron. 0.4 part of phenol was then added and the pH adjusted to 7 with 2.5 N sodium hydroxide solution followed by adding water to a final volume of 80 parts. The resulting solution was just as stable as that of Examples 1 and 2 but represented a more expensive product because of the additional step in the production of the positive sol.

When the same procedure was repeated using the potato dextrin of Example 2, a thoroughly stabilized solution resulted which had the same property as that above.

EXAMPLE 4

375 parts of ferric chloride hexahydrate were dissolved in 1600 parts of distilled water with agitation. A weak base anion exchange resin of the polystyrene polyamine type (hydroxyl form) described in United States Patent 2,591,574 and sold by Rohm & Haas Company under the designation "Amberlite IR-45" was then added in 100 part portions until 1800 parts had been added. If the pH has not reached 2.4-2.6, additional resin should be added until the desired range is achieved. The solution was then filtered from the resin and its iron content determined. Canary yellow potato dextrin having an intrinsic viscosity of about .125 to .155 and sold by the Morningstar Paisley Company under their designation of No. 621 Canary Potato Dextrin was added until the amount of the dextrin was approximately four times the iron content of the sol. The batch was then heated to 65-67° C. and then cooled to 40-45° C. and adjusted to a pH of 7.4-7.6 with 8% sodium hydroxide solution. The batch was then heated up to 65-70° C. and water evaporated. After filtration, further water is removed by distillation until the concentration of iron reached 100-104 milligrams per milliliter. The sol was then cooled to 50-55° and a half percent of phenol added as a preservative. The batch was then introduced into a sterilizing kettle and heated under pressure at 110-120° C. until sterilized.

EXAMPLE 5

The product of Examples 1 to 4 were tested biologically as follows:

The biological testing of ferric sol preparations consisted of four parts: (1) visual inspection of subcutaneous site of injection in the rat four days after injection, (2) hemoglobin response in anemic suckling pigs, (3) weight response in anemic suckling pigs, (4) toxicity in rats.

(1) *Visual inspection of subcutaneous sit of injection.*—Various ferric sols preparations were tested by this method. Many ferric sols were precipitated at the injection site and walled off to form a cyst by fibrotic infiltration of the area. The ferric sols stabilized with dextrin and adjusted to a physiologic pH did not precipitate nor was the area infiltrated with fibroblastic growth. Diffuse light staining of some still unabsorbed but stable material was observed.

(2) *Hemoglobin response in anemic suckling pigs.*—Pigs 2-4 days of age were injected with 2 ml. of the stabilized ferric sol by intramuscular or subcutaneous routes. Control pigs were injected with saline or suitable vehicle. Hemoglobin tests were made just before injection and at approximately one, two and three weeks after injection. The data (Tables I, II and IV) indicate the iron has been absorbed from the injection site, is available to the animal, and is utilized in the synthesis of hemoglobin; therefore, alleviating the symptoms of hypochromic anemia.

(3) *Weight response in anemic suckling pigs.*—The data (Tables I and II) suggests that pigs 2-4 days of age have a better weight gain due to treatment with the stabilized ferric sol. This effect is probably due to the more thrifty condition of the pig as a result of therapy alleviating the hypochromic anemia.

(4) *Toxicity in rats.*—Testing indicates that the stabilized ferric sol has a low order of toxicity in rates injected by the intraperitoneal route (Table III).

*Table I*

RESPONSE TO INJECTION OF A FERRIC SOL STABILIZED WITH DEXTRIN

| Treatment | Number animals | Pre-inj. body weight | Pre-inj., Hb. (g percent) | Body weight, 7 days post-inj. | Hb., 7 days post-inj. | Body weight, 18 days post-inj. | Hb., 18 days post-inj. | Body weight, 26 days post-inj. | Hb., 26 days post-inj. |
|---|---|---|---|---|---|---|---|---|---|
| Neg. control dextrin vehicle | 8 | 3.0 | 8.6 | 4.1 | 6.9 | 5.8 | 4.6 | 6.9 | 4.1 |
| Ferric sol with dextrin | 8 | 3.1 | 8.4 | 4.2 | 9.1 | 6.4 | 8.2 | 8.0 | 8.4 |

*Table II*

RESPONSE TO INJECTION OF A FERRIC SOL STABILIZED WITH DEXTRIN

| Treatment | Number animals | Pre-inj. body weight | Pre-inj., Hb. (g percent) | Body weight, 7 days post-inj. | Hb., 7 days post-inj. | Body weight, 14 days post-inj. | Hb., 14 days post-inj. | Body weight, 21 days post-inj. | Hb., 21 days post-inj. |
|---|---|---|---|---|---|---|---|---|---|
| Saline I.M. | 10 | 4.4 | 8.1 | 7.3 | 6.6 | 10.8 | 3.3 | 12.9 | 3.8 |
| Ferric Sol with Dextrin S.Q. | 7 | 4.4 | 8.1 | 8.6 | 10.0 | 11.8 | 6.5 | 15.9 | 6.9 |
| Ferric Sol with Dextrin I.M. | 6 | 4.9 | 7.6 | 9.1 | 9.5 | 12.1 | 6.7 | 16.1 | 7.4 |

Table III
TOXICITY TEST OF A FERRIC SOL STABILIZED WITH DEXTRIN IN THE RAT FOLLOWING INTRAPERITONEAL INJECTION

| Group No. | Dose | Mortality | | | | | | | | Remarks |
|---|---|---|---|---|---|---|---|---|---|---|
| | | 4 hrs. | 18 hrs. | 24 hrs. | 42 hrs. | 48 hrs. | 3 days | 5 days | 7 days | |
| I | 200 mg. Fe/kg. B.W. | 0/4 | 0/4 | 0/4 | 0/4 | 0/4 | 0/4 | 0/4 | 0/4 | |
| II | 300 mg. Fe/kg. B.W. | 0/4 | 0/4 | 0/4 | 0/4 | 0/4 | 0/4 | 0/4 | 0/4 | |
| III | 400 mg. Fe/kg. B.W. | 0/4 | 0/4 | 0/4 | 0/4 | 0/4 | 0/4 | 0/4 | 0/4 | Marked twitching of animal for 10 min. after inject. |
| IV | 600 mg. Fe/kg. B.W. | 0/4 | 0/4 | 0/4 | 0/4 | 0/4 | 0/3 | 0/3 | 0/3 | Marked twitching and hyperirritability for 10 min. after inject. |

Table IV
COMPARISON TESTS OF STABILIZED HIGH IRON SOLS OF 10% IRON WITH MEDIUM IRON SOLS OF 5% IRON

| Treatment | Number of pigs | Hemoglobin (gm. percent) | | | | | Body weight (lbs.) | | | | | 0-4 wk. Hb. (gain), g. percent | 0-4 wk. weight (gain), lb. |
|---|---|---|---|---|---|---|---|---|---|---|---|---|---|
| | | 0 | 1 wk. | 2 wk. | 3 wk. | 4 wk. | 0 | 1 wk. | 2 wk. | 3 wk. | 4 wk. | | |
| None | 8 | 4.2 | 3.9 | 2.7 | 2.7 | 2.9 | 3.7 | 6.5 | 8.2 | 8.3 | 8.6 | −1.3 | +4.9 |
| 5% iron sol | 8 | 4.6 | 8.2 | 8.2 | 8.5 | 7.7 | 4.0 | 7.0 | 8.6 | 9.6 | 10.4 | +3.1 | +6.4 |
| 10% iron sol | 9 | 5.6 | 10.4 | 11.7 | | 12.4 | 4.2 | 7.9 | 10.7 | | 15.2 | +6.8 | +11.0 |

The products of Examples 1 and 2 were tested against dextran stabilized ferric hydroxide sols sold by the owner of the London and Twigg patent. In every case, when using a 20 gauge needle, the product of Examples 1 and 2 remain in the muscle of the pig whereas with the dextran stabilized material, in practically every instance, there was serious leakback on removing the needle from the animal.

The ferric hydroxide sols of this invention have not as yet been demonstrated to be useful in human therapy.

This application is a continuation in part of our copending application Serial No. 762,230, filed September 22, 1958, now abandoned.

We claim:

1. A process of preparing a stabilized positively charged iron sol which comprises reacting a solution of a ferric salt with an anion exchange resin in the hydroxyl form until a positively charged ferric hydroxide sol results, removing the resin, adding solid low intrinsic viscosity potato canary yellow dextrin having an intrinsic viscosity of from 0.06 to 0.16, warming, and concentrating to an iron content of at least 1%.

2. A process according to claim 1 in which the concentration is continued to an iron content of approximately 10%.

3. A process according to claim 1 in which the ferric salt is ferric chloride.

4. A process according to claim 3 in which the concentration is continued to an iron content of approximately 10%.

References Cited in the file of this patent

UNITED STATES PATENTS 2,820,740    London et al.    Jan. 21, 1958

OTHER REFERENCES

Chemical Abstracts, vol. 44, page 5527g (1950).
Unlisted Drugs, 4:3, page 40, March 31, 1952.